July 23, 1929.  D. E. ROSS  1,721,791
CONTROL ASSEMBLY FOR STEERING GEARS
Filed Dec. 15, 1926    2 Sheets-Sheet 1
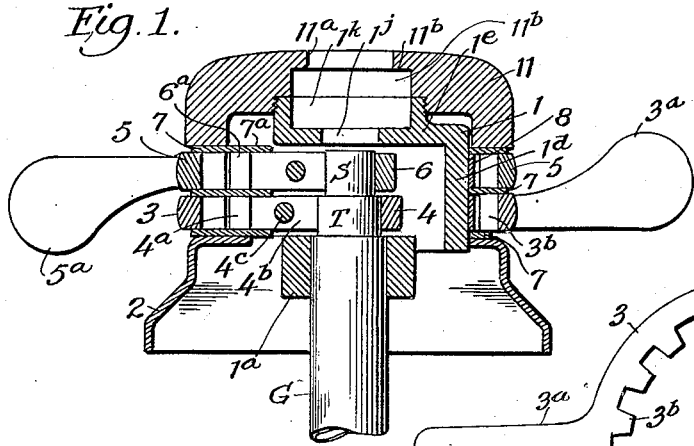
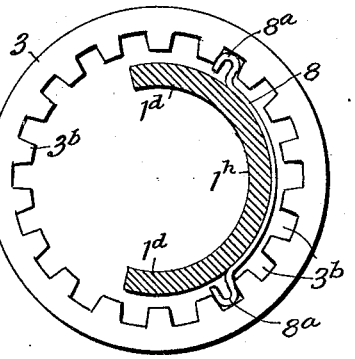
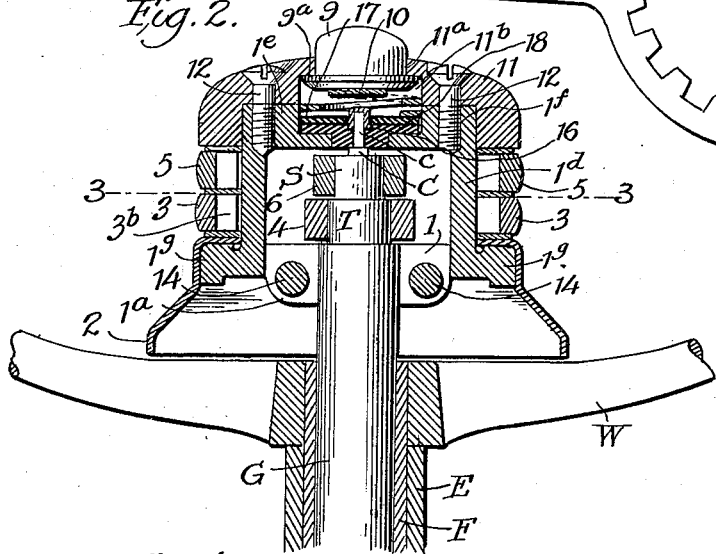
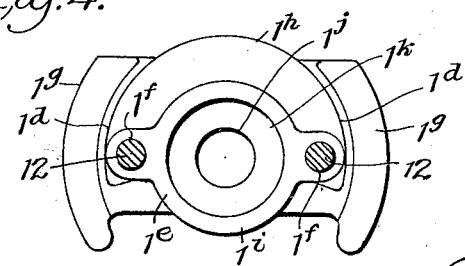
INVENTOR.
David E. Ross
BY
Alexander & Dowell
ATTORNEYS July 23, 1929.    D. E. ROSS    1,721,791
CONTROL ASSEMBLY FOR STEERING GEARS
Filed Dec. 15, 1926    2 Sheets-Sheet 2
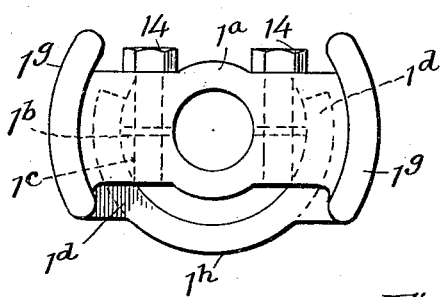
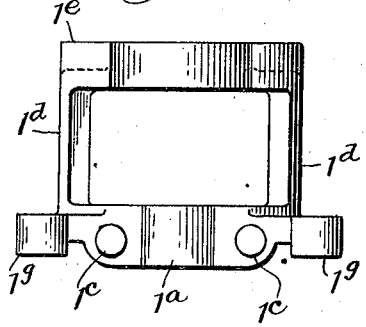
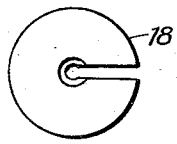
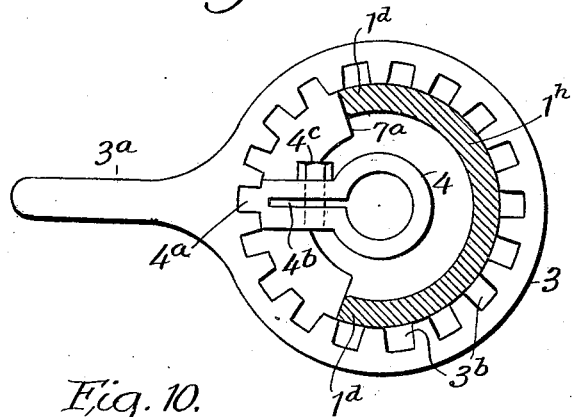
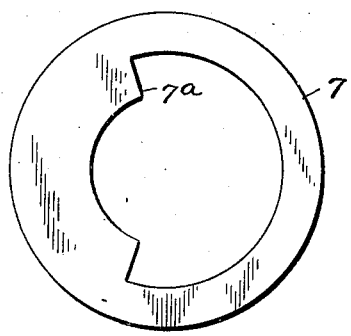
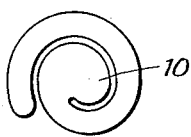

Patented July 23, 1929.

1,721,791

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

CONTROL ASSEMBLY FOR STEERING GEARS.

Application filed December 15, 1926. Serial No. 154,922.

This invention is a novel control assembly for use with the steering gear of automobiles, and provides controls mounted on the steering shaft and at the axis of the steering wheel so that the control levers can be readily shifted by the thumb or finger of the operator while his hands are engaged with the steering wheel.

The object of the invention is to provide a compact, simple, efficient, and durable control that can be readily assembled, and having a minimum of parts to be assembled.

I have illustrated one practical embodiment of the invention in the accompanying drawings, and will describe the same with reference to said drawings, to enable others to adopt and use the same; and summarize in the claims the essentials of the invention and the novel features of construction and combination of parts for which protection is desired.

In said drawings,—

Fig. 1 is a sectional view of an assembly of two controls for spark and throttle respectively; Fig. 2 is a similar vertical section at right angles to the section shown in Fig. 1, and also illustrating the electric signal control; Fig. 3 is a transverse section on the line 3—3, Fig. 2; Fig. 4 is a top view of the body casting which supports the operative parts of the control; Fig. 5 is a bottom view of said casting; Fig. 6 is a side view of such casting; Fig. 7 is a detail view of the insulating washer 18; Fig. 8 is a view similar to Fig. 3 showing a modification of the frictional devices; Fig. 9 is a view of one of the annular friction washers used in connection with the modification shown in Fig. 8; Fig. 10 is a detail view of spring 10.

In the drawings, G designates a stationary tube which is customarily housed within the steering tube F to which the steering wheel W is attached, and the latter being ordinarily rotatably mounted in an outer fixed standard or casing E, (these parts may be of any suitable kind and are merely conventionally illustrated in the drawings).

On the upper end of the supporting tube G is fixedly attached a supporting member 1 which may be a drop forging or casting (Figs. 5 and 6) and is adapted to carry all the operative parts of the control. This casting has a bottom member $1^a$ having an axial opening for engagement with the upper end of the tube G, and said bottom member is preferably provided on opposite sides of this opening with radial slots $1^b$, and is also provided with transverse openings $1^c$ at right angles to the slots $1^b$ for the reception of bolts 14 which may be freely passed through the openings at one side of the slots and tapped into the threaded openings at the other side of the slot, and by tightening these bolts the member 1 will be firmly clamped on the upper end of the tube G as indicated in the drawings.

The member 1 is provided with upright portions $1^d$ at opposite ends of the portion $1^a$ which connect the bottom portion $1^a$ with a top portion $1^e$, which approximately conforms in shape to the part $1^a$ and is parallel therewith. This top portion $1^e$ is preferably provided with threaded recesses $1^f$ for the reception of bolts 12 which secure the top piece or cover 11 onto the supporting member 1, as hereinafter referred to.

The side portions $1^d$ are preferably arcuate in cross section, as shown in Figs. 4 and 6. The member 1 is also provided at its bottom, exterior to the lower ends of the portions $1^d$, with projecting parti-cylindric flanges $1^g$ which preferably extend somewhat less than 90 degrees, the particular length thereof not being essential; the supporting member 1 is also provided at its bottom, at one side of the member $1^a$, with an arcuate extension $1^h$, (Fig. 5) whose outer surface is curved on an arc coincident with the arc of the outer surfaces of the portions $1^d$. The upper portion $1^e$ also has an axial opening $1^j$, at the upper end of which is an enlarged circular recess $1^k$ for the purpose hereinafter referred to.

The portions $1^d$, of the supporting member together form a partial cylinder having openings in its sides as shown in Figs. 5 and 6. The height of the portions $1^d$, $1^h$ of the supporting member 1 could be varied according to the number of control levers which it is desired to mount thereon, whether one or more, two control levers being shown in the drawings, but as these levers are duplicates, one or more than one may be used as desired.

An annular depending skirt or finishing member 2 is supported on the flanges $1^g$ as shown in Figs. 1 and 2, and covers the upper end of the hub of the steering wheel. This skirt might form an integral part of the casting 1, but for the purpose of economy is separately stamped and applied thereto as shown.

Rotatably mounted upon the supporting casting 1, above the flanges 1$^g$ and the skirt 2, are a plurality of similar superposed control levers; two being shown at 3 and 5, each comprising a preferably annular portion having an interior diameter corresponding to the exterior diameter of the portion 1$^h$ of the supporting member 1, and being rotatably centered upon said member by said portion 1$^h$, and being capable of turning thereon without becoming displaced.

The lower control lever has an annular portion 3 as stated, rotatably mounted upon the member 1 above the flanges 1$^g$, and skirt 2, and it may have a radially projecting handle 3$^a$ at one side by which it can be turned. The annular portion 3 has interior notches or serrations 3$^b$, any one of which may be engaged with a tooth 4$^a$ on the outer end of an arm 4 which is fitted on to the upper end of a tube T which may be the throttle control tube, said tube extending axially of and within the tube G. The arm 4 has an opening for engagement with tube T, and radially split at one side of such opening as at 4$^b$, and is provided with a bolt 4$^c$ extending through the slot 4$^b$ and tapped into one of the side walls of the slot; so that by tightening this bolt the arm 4 can be securely locked to the upper end of tube T.

It will be seen that the tooth 4$^a$ of arm 4 can be laterally engaged with one of the notches or serrations 3$^b$ in the lever 3, so that the lever can be rotatorially adjusted relative to the arm 4 to insure the desired operative relation between the lever and the tube T.

Above the lever 3 is another lever 5, in all respects similar to the lever 3, and engaged with an arm 6, similar to arm 4, attached to the upper end of a tube S which extends axially of and within the tube T, and may be the spark control lever. The handles or arms 3$^a$ and 5$^a$ of levers 3 and 5 may be disposed at the same or at opposite sides of the supporting member 1, and are preferably arranged to project at the same side thereof, one arm 3$^a$ being upturned and the other arm 5$^a$ being downturned if desired.

A series of annular washers 7 may be arranged above, between, and below the levers 3 and 5 as shown in the drawings. These washers may be provided with shoulders 7$^a$ (Fig. 9) adapted to engage the sides of the uprights 1$^d$ and prevent rotation of the washers when the levers are turned.

In order to hold the control levers in adjusted position I preferably employ in connection with each lever 3 and 5, a bow spring 8 (Fig. 3) which is interposed between the inner periphery of annular portion of the lever and the curved surfaces of portions 1$^d$ or 1$^h$ of the casting 1. The ends 8$^a$ of this spring may be bent outwardly and engaged with adjacent notches in the lever, as shown in Fig. 3, so that the spring has no sliding movement relative to the lever. The inner face of each spring 8 is in frictional contact with the outer faces of the curved portions 1$^d$, or 1$^h$ of the supporting member 1. These springs 8 can be located at any desired point in the lever by merely shifting the spring circumferentially thereof, and engaging its ends 8$^a$ with the adjacent notches or teeth. These springs 8 act as brake bands to hold the levers against casual rotation or displacement on the supporting member 1, and the washers 7 merely serve as spacers for the supporting levers.

Controls such as shown and described can be very readily assembled; and after they are assembled, a top or cover casting 11 is placed over the upper end of the supporting member 1 and fastened thereto by bolts 12 in Fig. 2. The upper end of the member 1 might be threaded, and cover 11 also threaded and screwed thereon (see Fig. 1) but I prefer the bolts. The cover 11 is approximately circular in plan, and has a diameter practically corresponding to the outer diameter of the levers 3 and 5. The cover 11 is shown as provided wih an axial opening 11$^a$ at the inner end of which is an enlarged circular recess 11$^b$ corresponding with the recess 1$^k$ in the member 1 (see Fig. 1). Within the aperture 11$^a$ is placed an ordinary horn button 9 having a flange 9$^a$ on its lower edge for engaging the recess 11$^b$ to retain the horn button in place, (see Fig. 2). This button is supported on the inner upper end of an ordinary convolute electric bell spring 10 (Figs. 2 and 10) which is in turn supported on an insulating plate 17 mounted within the recess 1$^k$ in the supporting casting 1 and resting upon an insulating bushing 18 fitted in this recess 1$^k$ and having a reduced portion entered into the opening 1$^j$. The bushing 18 has an axial aperture large enough for the passage of the bared end $c$ of an electrical conductor C which extends down through the spark tube S. A metal contact piece 16 is soldered to the upper end of the wire $c$, said contact piece 16 being centered and retained in position on the insulating bushing 18 by an insulating or fiber washer 17. This electric push button construction is practically similar to the ordinary electric door bell push button, and does not require any screws for fastening the wire.

The spiral flat spring 10 is preferably made slightly larger in its outer diameter than the interior diameter of the recess 1$^k$ to assure a close fit and good electrical contact between the spring 10 and supporting member 1.

This spring 10 holds the button 9 raised, and the parts 16, 18, and 17 in position without the necessity of employing any screws.

In assembling the device the conductor C can be pulled up through the aperture 1$^j$ the washer 18 slipped on the exposed part $c$ of the conductor, and the piece 16 soldered or brazed to the exposed part $c$; and then the bushing 18 is placed in the recess 1$^k$, and the washer 17 placed thereover; then the spring 10 is inserted, and finally cover 11, with the button 9 therein, put in position, and secured in place.

In my invention the supporting member 1 is an essential element. It obviates the necessity of assembling any parts by screws or bolts. No part of this member is exposed to view in the final assembly, so that it is not necessary that this member be burnished or highly polished. Its cylindrical construction imparts great rigidity to the structure; and it provides a substantial mounting for the horn button, and a very rigid central support for the disks to rotate upon and keep them securely in axial concentric alignment.

The levers 3 and 5 are duplicates; so are the arms 4 and 6. They work equally well turned up or down. The arm 4 can be engaged at any part of the levers with respect to handles 3$^a$, 5$^a$ merely by engaging the teeth with the proper notches in the lever; furthermore, the arcuate movements of the levers 3 and 5 are limited by the arms 4 and 6 (as shown in Fig. 8), the arms 4 and 6 being swingable through the arc limited by the ends of the members 1$^d$ opposite the portion 1$^h$.

By the above construction, the usual wheel nut (not shown) can be removed after taking off the sector set, by disconnecting members 1, 4, and 6, and the conductor $c$, without in any way disturbing the nest of concentric tubes E, F, G, T, S; a feature which is particularly desirable in automobiles and the like having closed type bodies, since the steering gear does not have to come out of the automobile in order to remove the steering wheel.

The friction spring 8 has a further advantage in that the member 1, and levers 3 and 5 are usually made of a comparatively soft metal, and there might be a tendency on the part of the inner teeth of the levers 3 and 5 to stick to the member 1. This spring 8 being of an unlike metal would not stick, and will act as a bushing between the like levers 3 and 5 and the cylindric portion of member 1.

The novel construction permits either control tube and lever to be turned without turning, or tending to transmit rotary movement to any other control tube and lever. The vertical portions of the supporting member form stops to limit the arcuate movements of the the control levers. Obviously the number of control tubes and levers used may be varied according to the number of different controls which it is desired to have assembled at the center of the steering wheel, such additional control tubes and levers being merely duplicates of those shown.

I do not herein claim the push button arrangement which will form the subject matter of a divisional application.

I claim:

1. In a control assembly, a supporting member having top and bottom portions and an intermediate arcuate portion connecting the top and bottom portions, said member being attachable to a supporting tube; a control lever rotatably mounted upon said supporting member; a control tube extending through the supporting member; and an arm connecting the control tube and the control lever; said control lever being limited in its swinging movement by the intermediate portion of said supporting member.

2. In a control assembly, a supporting member having top and bottom portions and an intermediate arcuate portion connecting the top and bottom portions, said member being attachable to a supporting tube; a control lever rotatably mounted upon said supporting member; a control tube extending through the supporting member; and an arm connecting the control tube and the control lever; said control lever being limited in its swinging movement by the intermediate portion of said supporting member; friction means for holding the control lever in adjusted position relative to the supporting member.

3. In a control assembly, a supporting member having top and bottom portions and intermediate portions connecting the top and bottom portions, said member being attachable to a supporting tube; a control lever rotatably mounted upon said supporting member; a control tube extending through the supporting member; and an arm connecting the control tube and the control lever; said control lever being limited in its swinging movement by the intermediate portions of said supporting member; and said control lever having an inner peripheral surface, and a bowed spring entered between the peripheral surface of the lever and the supporting member for holding the control lever in adjusted position relative to the supporting member.

4. In a control assembly, a supporting member having top and bottom portions and intermediate parti-cylindric portions connecting the top and bottom portions, said member being attachable to a supporting tube; a control lever rotatably mounted upon said supporting member; a cover member attached to said supporting member and confining the rotatable lever thereon; a control tube extending through the supporting member; and an arm connecting the control tube and the control lever; said control lever being limited in its swinging movement by the vertical portions of said supporting member.

5. In combination with a control assembly as set forth in claim 4,—friction means between the lever and supporting member for holding the control lever in adjusted position relative to the supporting member.

6. In combination with a control assembly as set forth in claim 4; said control lever having an inner peripheral surface, and a bowed spring entered between the peripheral surface of the lever and the supporting member for holding the control lever in adjusted position relative to the supporting member.

7. In a control assembly, a supporting member having top and bottom portions and intermediate parti-cylindric portions connecting the top and bottom portions; said members being attachable to a supporting tube; a plurality of superposed levers rotatably mounted upon said supporting member; a cover member attached to said supporting member and confining the rotatable levers thereon; control tubes extending through the supporting member; arms connecting the control tubes with the control levers; means for holding the control levers in adjusted positions relative to the supporting member; said control levers being limited in their movement by the parti-cylindric portions of the said supporting members.

8. In combination with a control assembly as set forth in claim 7,—said control levers having inner peripheral surfaces, and the means for holding the control levers in adjusted position comprising springs entered between the peripheral surfaces of the levers and the supporting member.

9. In a control assembly, a supporting member comprising top and bottom portions and intermediate parti-cylindric portions connecting the top and bottom portions; said member being attachable to a supporting tube; with a skirt detachably mounted upon said supporting member; and a cover detachably attached to said supporting member.

10. In a control assembly, a supporting member; a lever having an annular portion rotatably mounted upon said supporting member; said annular portion having its inner periphery notched or serrated; and a bowed spring entered between the opposed curved surfaces of the lever and the supporting member for holding the control lever in adjusted position.

11. In a control assembly, a supporting member, a control lever rotatably mounted upon said supporting member and having an annular portion provided with notches or serrations in its inner face; a control tube extending through the supporting member; and an arm on said tube engaging a serration in the lever; with a bowed spring entered between the inner surface of the lever and the supporting member for holding the control lever in adjusted position.

12. In a control assembly, a supporting member having integral top, bottom and connecting portions; and attachable to a supporting tube; a plurality of superposed levers rotatably mounted upon said supporting member; a cover member attached to said supporting member and confining the rotatable levers thereon; control tubes extending through the supporting member; arms connecting the control tubes with the control levers; said levers being limited in their movement by the said connecting portions of the said supporting member; and bowed springs entered between the opposed peripheral surfaces of the levers and their respective supporting members for holding the control levers in adjusted positions relative to the supporting members.

13. For a control assembly, a supporting member comprising top and bottom portions and intermediate arcuate portions connecting the top and bottom portions, the bottom portion of said member having an opening, and slots at opposite sides of the opening; and tap bolts for contracting the opening to secure the member to a supporting tube.

14. In a control assembly, a supporting member, a control lever rotatably mounted upon said supporting member and having an annular portion provided with notches or serrations in its inner face; a control tube extending through the supporting member; an arm on said control tube engaging a notch in the lever; and means for holding the control lever in adjusted positions comprising a bowed spring entered between the opposed peripheral surfaces of the lever and the supporting member.

15. In a control assembly, a supporting member; a lever rotatably mounted upon said supporting member, said member and said lever having opposed curved peripheral surfaces, and a bowed spring entered between the said opposed curved surfaces for holding the lever in adjusted position.

16. In a control assembly, a supporting member having a curved peripheral portion; a lever rotatably mounted upon said supporting member, and having an annular portion and an inner peripheral curved portion; and a bowed spring entered between the opposed curved peripheral portion of the lever and the supporting member for holding the control lever in adjusted position.

17. In a control assembly, a supporting member; a lever rotatably mounted upon said supporting member and having an annular portion provided with notches on its inner side; and a bowed spring entered between the opposed curved surfaces of the lever and the supporting member for holding the control lever in adjusted position.

18. In a control assembly, a supporting member; a lever having an annular portion rotatably mounted upon said supporting member; said annular portion having its inner periphery notched; and a bowed spring entered between the opposed curved surfaces of the lever and the supporting member and having its ends engaged with the notches in the lever; said spring holding the control lever in adjusted position.

In testimony that I claim the foregoing as my own, I affix my signature.

DAVID E. ROSS.